(12) United States Patent
Urasawa et al.

(10) Patent No.: US 6,569,055 B2
(45) Date of Patent: May 27, 2003

(54) FOUR-WHEEL DRIVE HYBRID VEHICLE

(75) Inventors: Toru Urasawa, Isehara (JP); Satoshi Sakakibara, Yamato (JP); Chiaki Harada, Zama (JP); Asuka Soutome, Sagamihara (JP); Ryozo Hiraku, Atsugi (JP); Makoto Shouji, Sagamihara (JP); Takashi Nakazawa, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/022,217

(22) Filed: Dec. 20, 2001

(65) Prior Publication Data

US 2002/0094908 A1 Jul. 18, 2002

(30) Foreign Application Priority Data

Jan. 16, 2001 (JP) ........................................ 2001-007390

(51) Int. Cl.⁷ .............................................. B60K 41/02
(52) U.S. Cl. ........................................... 477/5; 180/65.2
(58) Field of Search ........................ 477/3, 5; 180/65–2, 180/64

(56) References Cited

U.S. PATENT DOCUMENTS 6,319,168 B1 * 11/2001 Morris et al. .................. 477/5

FOREIGN PATENT DOCUMENTS

| JP | 10-030688 | 2/1998 |
| JP | 10-246134 | 9/1998 |
| JP | 2000-014103 | 1/2000 |

* cited by examiner

*Primary Examiner*—Dirk Wright
(74) *Attorney, Agent, or Firm*—Foley & Lardner

(57) ABSTRACT

A hybrid vehicle includes a first motor generator (1) and an engine (3) connected to first drive wheels (7) via a transmission (5), a second motor generator connected to a second drive wheel (17), a battery (8) electrically connected to the first and second motor generators (7,17), a sensor (25) which detects a running state of the vehicle, a sensor which detects a charge state of the battery (8), and a controller (10,11,12). The controller (10,11,12) controls a drive force of the engine (3) and the first motor generator (1) according to the running state of the vehicle and the charge state of the battery (8), and drives the second motor generator (2) by the battery (8) or the power generated by the first motor generator (1).

8 Claims, 12 Drawing Sheets

|  | FRICTION DEVICE | | | | | | | | | |
| --- | --- | --- | --- | --- | --- | --- | --- | --- | --- | --- |
| GEAR POSITION | C1 | C2 | C3 | B1 | B2 | B3 | B4 | F1 | F2 | F3 |
| 1st |  | ● |  |  | ● | ● | ○ | ○ | ○ | ○ |
| 2nd |  |  | ○ |  | ● | ● | ○ |  | ○ | ○ |
| 3rd |  | ○ | ○ |  | ● |  | ○ |  | ○ |  |
| 4th | ○ | ○ | ○ |  |  |  | ○ |  |  |  |
| 5th | ○ | ○ |  |  | ○ |  | ○ |  |  |  |
| Rev |  | ● |  | ○ | ● |  |  | ○ | ○ |  |

*FIG. 4*

FOUR-WHEEL DRIVE HYBRID VEHICLE

FIELD OF THE INVENTION

This invention relates to a four-wheel drive hybrid vehicle.

BACKGROUND OF THE INVENTION

JP-A-H10-246134 published by the Japanese Patent Office in 1998 discloses a hybrid vehicle wherein an engine is combined with a motor generator, and the vehicle is driven by either one or both of the engine and motor generator. The combination of the engine and automatic transmission with the motor generator, and the provision of a center differential gear, makes it is possible to realize four-wheel drive.

In this prior art, when regeneration is performed by the motor generator, a forward clutch of the transmission is released, and the regeneration amount from the motor generator is increased.

SUMMARY OF THE INVENTION

However, in this prior art, regeneration is performed while the forward clutch of the transmission is released, so the engine must rotate by itself during regeneration, and fuel cut cannot be performed. Hence, a fuel supply is required to maintain the engine rotating, and although the regeneration amount can be increased, fuel consumption performance decreases.

If on the other hand fuel cut is performed while the forward clutch is still engaged and the regeneration is performed, since the engine brake force acting on the vehicle becomes a value corresponding to the torque required to drive the engine and motor generator, it is difficult to control the engine braking force to a suitable value. Further, the vehicle decelerates while the engine and drive wheels are still connected, so regeneration cannot be performed until a very low vehicle speed is reached at which the input shaft rotation speed of the transmission is less than the idle rotation speed of the engine.

Moreover, the construction of the four-wheel drive hybrid vehicle having a mechanical center differential gear is complex.

It is therefore an object of this invention to provide a four-wheel-drive hybrid vehicle having a simple construction. It is a further object of this invention to achieve an optimum engine braking force while increasing the regeneration amount.

In order to achieve above object, this invention provides a hybrid vehicle, including a first drive wheel, a second drive wheel, an automatic transmission, a first motor generator and engine connected to the first drive wheel via the transmission, a second motor generator connected to the second drive wheel, a battery electrically connected to the first and second motor generators, and a controller functioning to determine a running state of the vehicle, determine a charge state of the battery, control the drive force of the engine and the first motor generator based on the running state of the vehicle and the charge state of the battery, and drive the second motor generator using the battery and the power generated by the first motor generator.

The details as well as other features and advantages of this invention are set forth in the remainder of the specification and are shown in the accompanying drawings.

BRIEF DESCRIPTION OF THE DRAWINGS

FIG. 4 is a table showing the state of friction devices at various gear positions. The white circles show the devices which operate or engage when the vehicle is driven, and the black circles show the devices which operate or engage when the engine braking force is transmitted.

DESCRIPTION OF THE PREFERRED EMBODIMENTS

Figure 1:
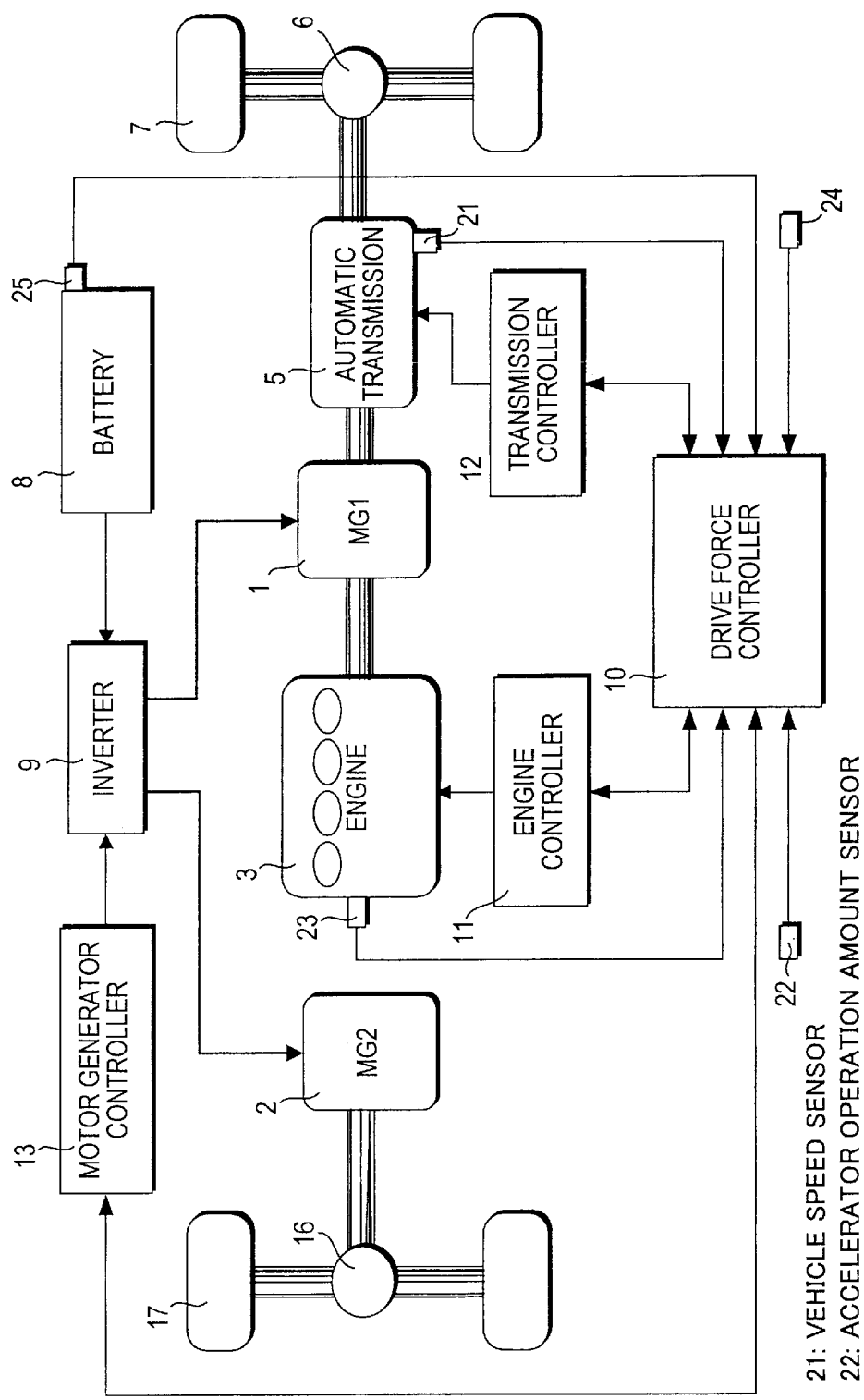
FIG. 1 is a schematic view of a hybrid vehicle according to this invention.

Referring to FIG. 1 of the drawings, a hybrid vehicle to which this invention is applied is a four-wheel drive vehicle. The power train comprises a first drive line wherein an engine 3 is connected to rear wheels 7 via a first motor generator 1, an automatic transmission 5 and a rear differential gear 6, and a second drive line wherein a second motor generator 2 is connected to front wheels 17 via a front differential gear 16.

The output shaft of the engine 3, the output shaft of the motor generator 1 and the input shaft of the automatic transmission 5 are interconnected. In this power train, the rear wheels 7 are driven by the torque of either one or both of the engine 3 and the first motor generator 1. The front wheels 17 are driven by the torque of the second motor generator 2. During deceleration, the second motor generator 2 connected to the front wheels 17 and the first motor generator 1 connected to the rear wheels 7 regenerate power independently.

The second motor generator 2 drives the front wheels 17, and regenerates power from the front wheels 17. The first motor generator 1 drives the rear wheels 7 and regenerates power from the rear wheels 7, and is used for starting and generating power from the engine 3. When the charge amount of a battery 8 falls, the battery 8 is charged by power generated by the first motor generator 1.

The motor generators 1 and 2 are alternating current motors, and are both connected with the battery 8 via an inverter 9. The construction of the motor generators 1 and 2 is the same as that of JP-A-2000-14103 published by the Japanese Patent Office in 2000. The inverter 9 is controlled by a motor generator controller 13.

The engine 3 is controlled by an engine controller 11, and the automatic transmission 5 is controlled by a transmission controller 12. The controllers 11–13 each comprise at least one microprocessor, RAM, ROM and I/O interface, and respectively perform control based on commands from a drive force controller 10 which determines drive force according to a running state. The engine controller 11 stops fuel injection to the engine 3 (fuel cut) in a predetermined running state, for example, when the accelerator pedal is released.

Figure 2:
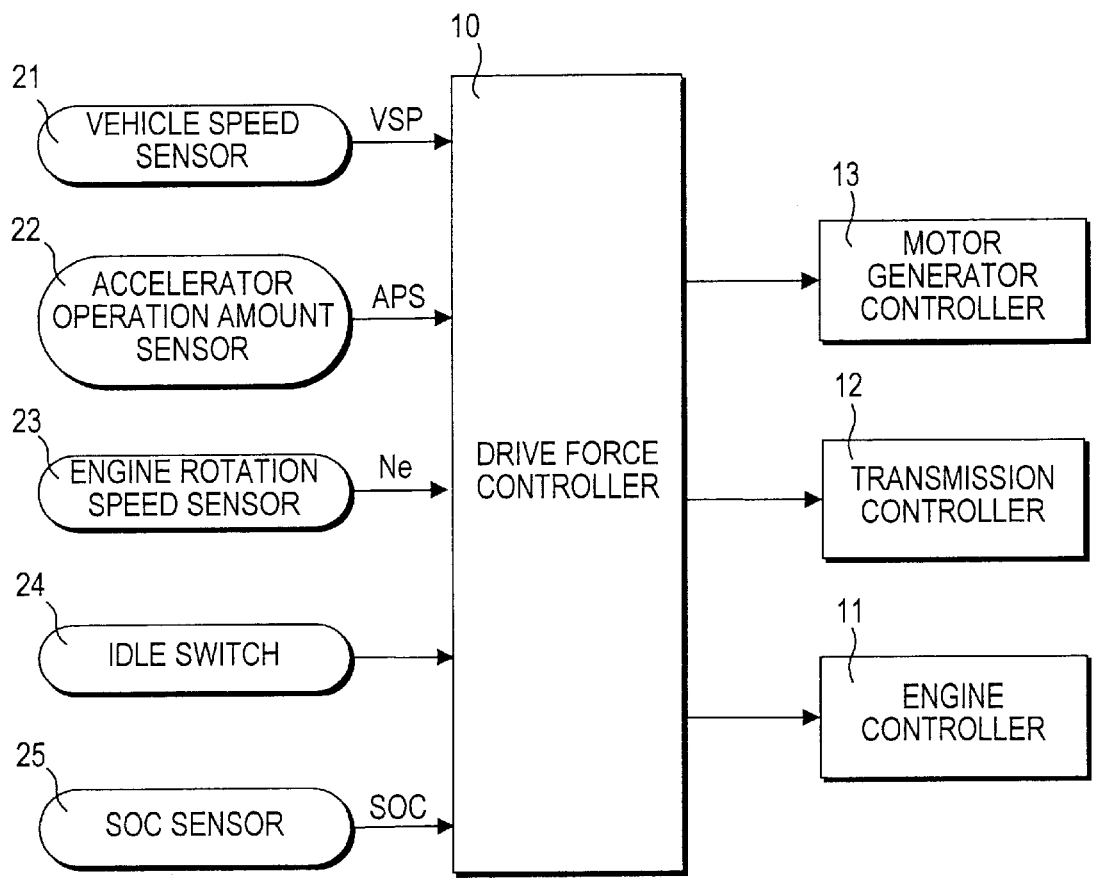
FIG. 2 is a schematic view of a drive force controller of the vehicle.

The signals which are input to the drive force controller 10, as shown in FIG. 2, are a vehicle speed VSP from a vehicle speed sensor 21, accelerator operation amount APS from an accelerator operation amount sensor 22 (or throttle opening), engine rotation speed Ne from an engine rotation speed sensor 23, a signal from an idle switch 24, and a charge state SOC of the battery 8 from an SOC sensor 25.

The drive force controller 10 determines a running state based on the signals from these sensors, computes a target drive force according to the running state of the vehicle, and determines the target drive force of the motor generators 1 and 2, and the target drive force of the engine 3 based on the running state and the charge state SOC of the battery 8. The speed ratio (or gear position) for realizing these target drive forces is also determined, and commands are sent to the engine controller 11, transmission controller 12 and motor generator controller 13.

Figure 3:
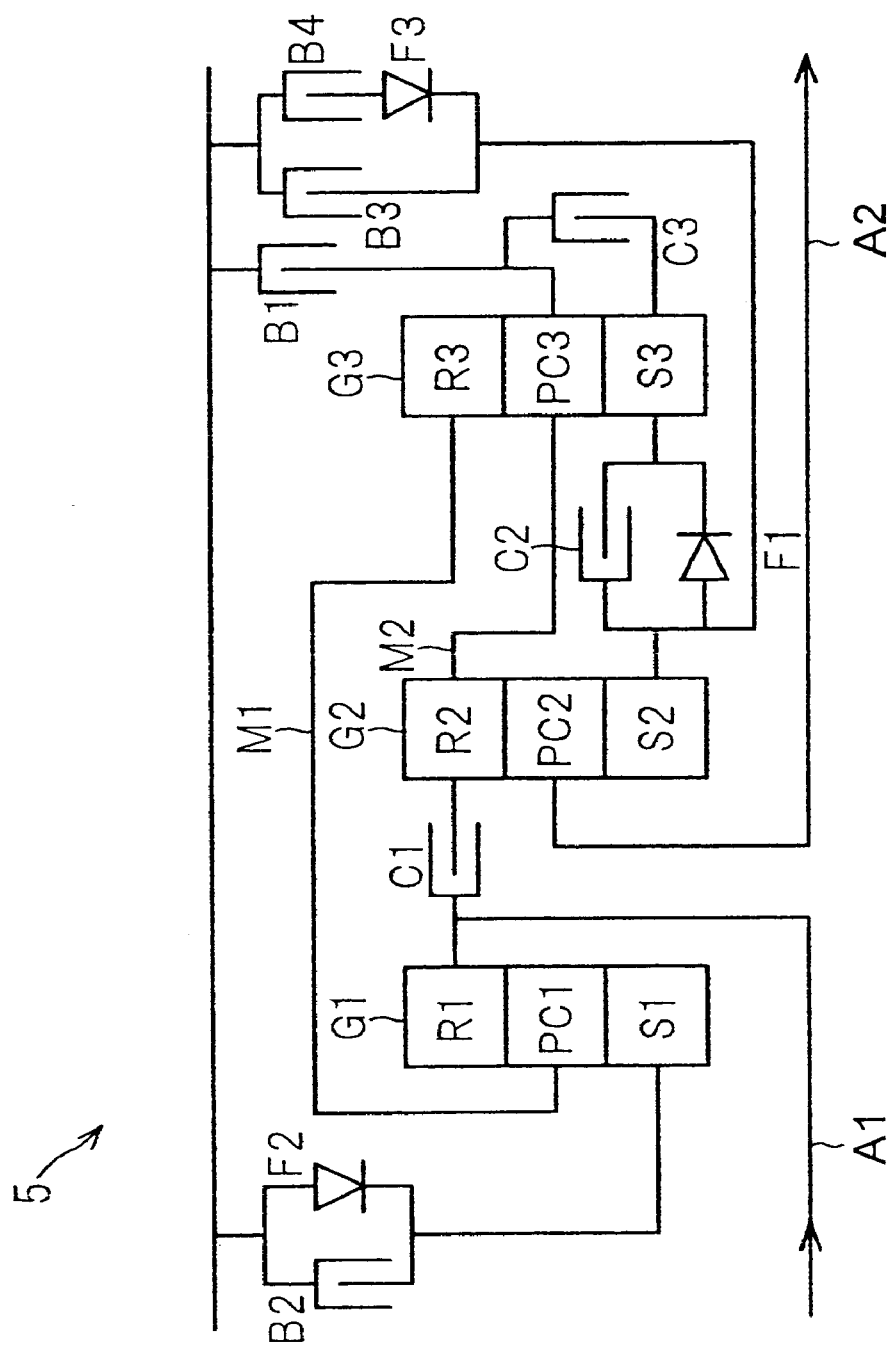
FIG. 3 is a schematic view of an automatic transmission of the vehicle.

The transmission 5 is an automatic transmission comprising three planetary gear sets G1, G2, G3, as shown in FIG. 3. As in the case of the transmission disclosed in JP-A-H10-30688 published by the Japanese Patent Office in 1998, this transmission is a 5 speed forward, 1 speed reverse transmission.

In FIG. 3, G1, G2, G3 are the planetary gear sets, M1 and M2 are connection members, C1, C2, C3 are clutches, B1, B2, B3, B4 are brakes, F1, F2, F3 are one-way clutches, A1 is an input shaft and A2 is an output shaft.

The planetary gear sets G1, G2, G3 are all single pinion types. The first planetary gear set G1 comprises a first sun gear S1, a first ring gear R1, and a first carrier PC1 which supports a pinion which engages with both the gears S1 and R1. The second planetary gear set G2 comprises a second sun gear S2, second ring gear R2 and a second carrier PC2 which supports a pinion which engages with both the gears S2 and R2. The third planetary gear set G3 comprises a third sun gear S3, a third ring gear R3, and a third carrier PC3 which supports a pinion which engages with both the gears S3, R3.

The first connection member M1 is a member which connects the first carrier PC1 and the third ring gear R3. The second connection member M2 is a member which connects the third carrier PC3 with the second ring gear R2.

The first clutch C1 is a clutch for engaging the first ring gear R1 and second ring gear R2. The second clutch C2 is a clutch for engaging the second sun gear S2 and third sun gear S3. The first one-way clutch F1 is provided in parallel with the second clutch C2. The third clutch C3 is a clutch for engaging the third carrier PC3 and the third sun gear S3.

The first brake B1 is a brake for stopping rotation of the second connection member M2. The second brake B2 is a brake for stopping rotation of the first sun gear S1. The second one-way clutch F2 is provided in parallel with the second brake B2.

The third brake B3 is a brake for stopping rotation of the second sun gear S2. A fourth brake B4 and the third one-way clutch F3 (the brake B4 and the one-way clutch F3 are disposed in series) are provided in parallel with the third brake B3.

The input shaft A1 is connected with the first ring gear R1, drive force from the engine 3 being input via a torque converter. The output shaft A2 is connected with the second carrier PC2, and the transmitted torque is transmitted to the rear wheels 7 via a final gear.

An oil pressure control device which generates an engaging pressure or release pressure according to the gear position is connected to the clutches C1, C2, C3 and brakes B1, B2, B3, B4.

In the transmission 5, the friction devices (C1–C3, B1–B4, F1–F3) operate according to the gear position as shown in the table of FIG. 4. In FIG. 4, the white circles show the friction devices which operate or engage to transmit power to the rear wheels 7 from the engine 3 or motor generator 1 when the vehicle is driven, and the black circles show the friction devices which operate or engage when the engine brake is applied during deceleration, or when the accelerator operation amount APS falls below a predetermined value and the engine brake is applied. The gear position is determined referring a shift map based on the position of a selector lever, the vehicle speed, and the accelerator operation amount.

Hereafter, the state of the friction devices in each gear position will be described.

<First Gear>

When the vehicle is driven in first gear, the second sun gear S2 engages with the third sun gear S3 due to operation of the first one-way clutch F1, or the engagement of the second clutch C2. Also, the sun gears S2, S3 are both fixed to the transmission case by the engagement of the fourth brake B4 and the operation of the third one-way clutch F3, or the engagement of the third brake B3.

Therefore, when the vehicle is driven in first gear, the first sun gear S1 is fixed to the transmission case by the operation of the second one-way clutch F2, and the first ring gear R1 and second ring gear R2 are separated by release of the first clutch C1. In the second planetary gear set G2, the rotation of the output shaft A2 is determined by the rotation of the second ring gear R2 (a slower rotation than the rotation of the first connection member M1), and the fixation of the second sun gear S2. It is much slower than the rotation of the input shaft A1.

On the other hand, as the black circles in FIG. 4 show, when the engine brake is applied during deceleration, the second clutch C2, second brake B2 and third brake B3 are engaged in addition to the friction devices engaged when the vehicle is being driven. When the engine brake acts on the vehicle, the first sun gear S1 is fixed to the transmission case due to the engagement of the second brake B2, and the first ring gear R1 and second ring gear R2 are separated by release of the first clutch C1.

<Second Gear>

When the vehicle is driven in second gear, the third clutch C3 is engaged from first gear.

In second gear, the first sun gear S1 is fixed to the transmission case by operation of the second one-way clutch F2, and the first ring gear R1 and second ring gear R2 are separated due to disengagement of the first clutch C1. Due to the disengagement of the second clutch C2 and engagement of the third clutch C3, the third planetary gear set G3 rotates in one piece. Further, due to the engagement of the fourth brake B4 and the operation of the third one-way clutch F3, the second sun gear S2 is fixed to the transmission case.

Therefore, in the second planetary gear set G2, the rotation of the output shaft A2 is determined by the rotation of the second ring gear R2 (the same rotation as that of the first connection member M1) and the stopping of the second sun gear S2, and decreases less than the rotation of the input shaft.

On the other hand, when the engine brake is applied in second gear, in addition to the friction devices which engage when the vehicle is driven, the second brake B2 is engaged and the first sun gear S1 is fixed to the transmission case. In addition, the first clutch C1 is disengaged to separate the first ring gear R1 and second ring gear R2. The third planetary gear set G3 rotates in one piece due to the engagement of the second clutch C2 and third clutch C3. Further, the second gear S2 is fixed to the transmission case by the engagement of the fourth brake B4 and engagement of the third brake B3.

<Third Gear>

When the vehicle is driven in third gear, the second clutch C2 is engaged from second gear.

In third gear, the first sun gear S1 is fixed to the transmission case due to the operation of the second one-way clutch F2, and the first ring gear R1 and second ring gear R2 separate due to disengagement of the first clutch C1.

The second planetary gear set G2 and third planetary gear set G3 rotate together due to the engagement of the second clutch C2 and third clutch C3.

Therefore, in the second planetary gear set G2, the rotation of the output shaft A2 is determined to be the same as the rotation of the first connection member M1 due to the rotation of the second ring gear R2 (same as the rotation of the first connection member M1) and the rotation of the second sun gear S2 (same as the rotation of the first connection member M1), and the input rotation is reduced only by the first planetary gear set G1.

On the other hand, when the engine brake is applied, as shown by the black circles in FIG. 4, in addition to the friction devices which engage when the vehicle is driven, the second brake B2 is engaged and the first sun gear S1 is fixed to the transmission case.

<Fourth Gear>

When the vehicle is driven in fourth gear, as shown by the white circles in FIG. 4, the first clutch C1 is engaged from third gear.

In fourth gear, the first ring gear R1 and second ring gear R2 are engaged due to the engagement of the first clutch C1. The second planetary gear set G2 and third planetary gear set G3 rotate together due to the engagement of the second clutch C2 and third clutch C3. Therefore, the input shaft A1 and output shaft A2 are linked, the input shaft and output shaft perform the same rotation, and the gear ratio is 1.

In this fourth gear, the engine brake is always operating.

<Fifth Gear>

When the vehicle is driven in fifth gear, as shown by the white circles in FIG. 4, the third clutch C3 is released from fourth gear, and the second brake B2 is engaged.

In fifth gear, the first sun gear S1 is fixed to the transmission case due to the engagement of the second brake B2 or the operation of the second one-way clutch F2, and the first ring gear R1 and second ring gear R2 are linked due to the engagement of the first clutch C1. The second sun gear S2 and third sun gear S3 are also linked due to the operation of the first one-way clutch F1 or the engagement of the second clutch C2 and disengagement of the third clutch C3.

Therefore, in the second planetary gear set G2, the rotation of the output shaft A2 is determined by the rotation of the second ring gear R2 (input rotation) and the rotation of the second sun gear S2 (faster rotation than input rotation), and is faster than the rotation of the input shaft A1.

In this fifth gear also, the engine brake is always operating.

In the above forward first to fifth gear, the second brake B2 and fourth brake B4 function as clutches to make the engine brake operate.

<Reverse Gear>

In reverse gear, as shown in FIG. 4, the second clutch C2, first brake B1 and second brake B2 are engaged.

The first sun gear S1 is fixed to the transmission case due to the operation of the second one-way clutch F2 or engagement of the second brake B2, and the first ring gear R1 and second ring gear R2 separate due to the disengagement of the first clutch C1. The second sun gear S2 and third sun gear S3 are linked due to the operation of the first one-way clutch F1 or the engagement of the second clutch C2, and the second connection member M2 is fixed due to the engagement of the first brake B1.

Therefore, in the second planetary gear set G2, the rotation of the output shaft A2 is determined by the fixing of the second ring gear R2 and reverse rotation of the second sun gear S2, and is the reverse of the rotation of the input shaft A2.

Figure 5:
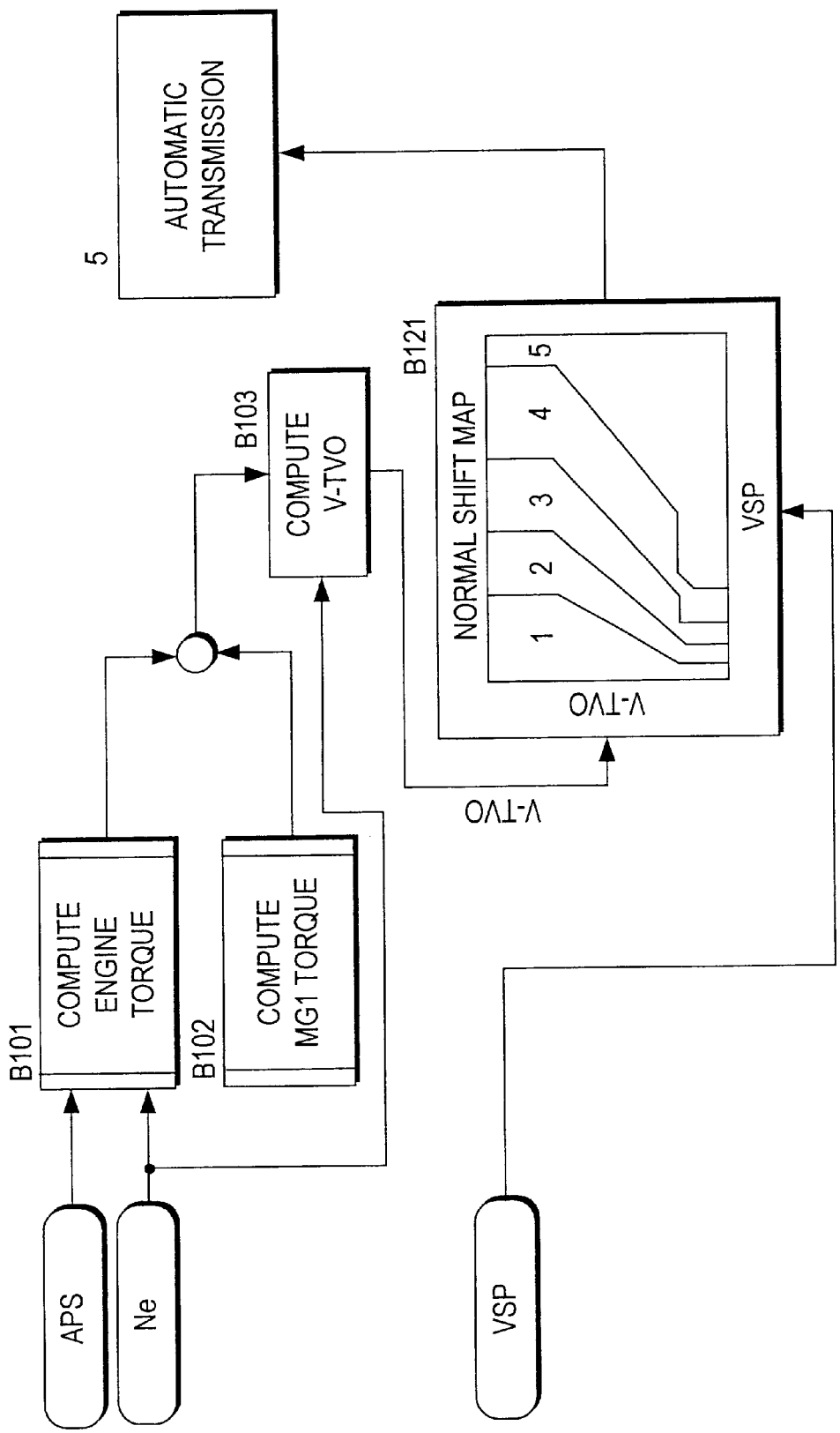
FIG. 5 is a block diagram of speed change control.

Transmission control by the drive force controller 10 and transmission controller 12 is performed based on the vehicle speed VSP from the vehicle speed sensor 21, an accelerator operation amount APS from the accelerator operation amount sensor 22 (or throttle opening), and an engine rotation speed Ne from the engine rotation speed sensor 23, as shown in FIG. 5.

Figure 6:
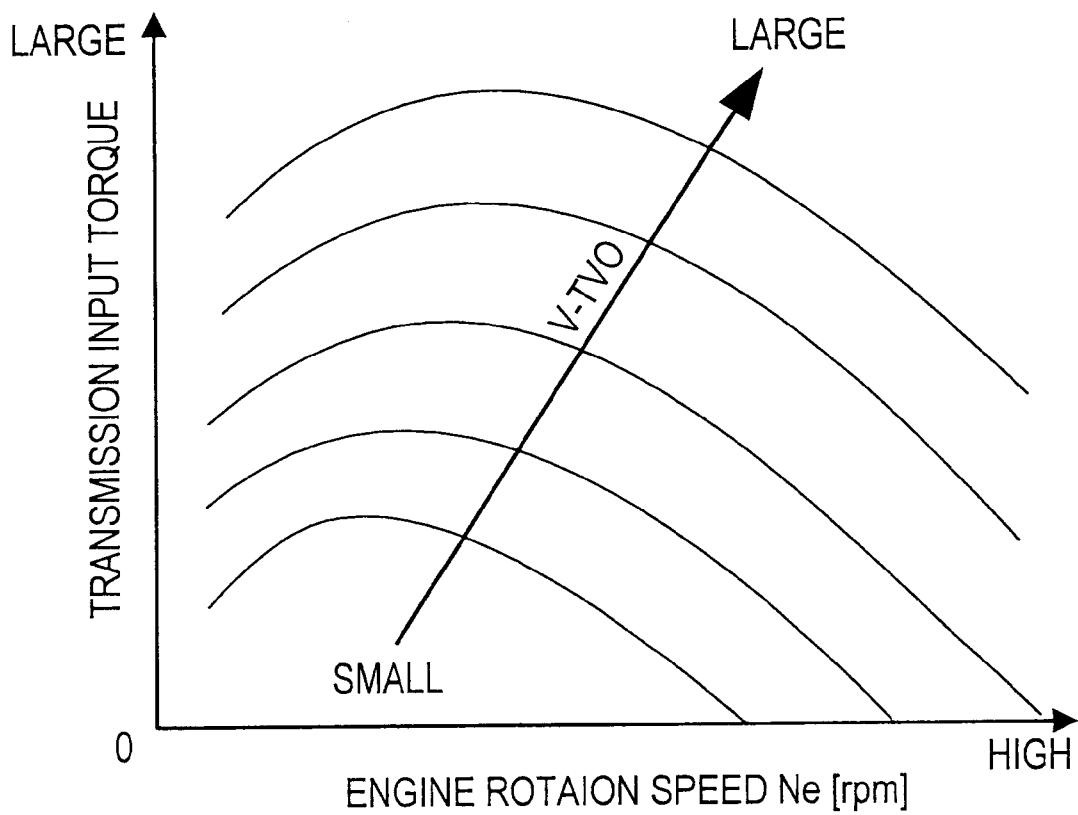
FIG. 6 is a map for computing a virtual throttle opening V-TVO from the engine rotation speed Ne and input torque of the automatic transmission.

A block B101 computes the engine torque generated by the engine 3 based on the accelerator operation amount APS and the engine rotation speed Ne. A block B102 computes the torque generated or consumed by the first motor generator 1. A block B103 computes a virtual throttle opening V-TVO based on a map shown in FIG. 6 from the transmission input torque (=sum of the engine torque and the first motor generator torque), and the engine rotation speed Ne.

Figure 7:
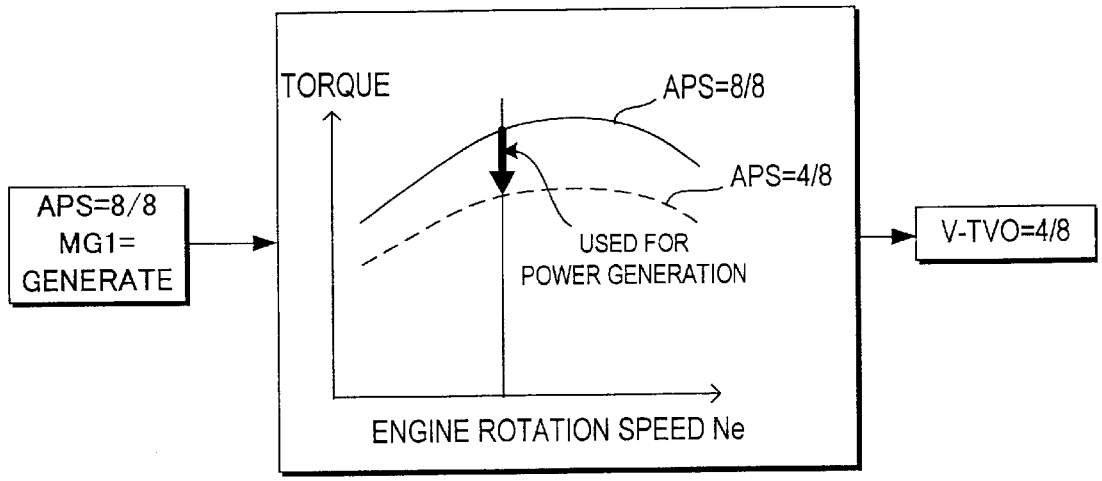
FIG. 7 is a diagram describing the virtual throttle opening V-TVO when the first motor generator generates power.
Figure 8:
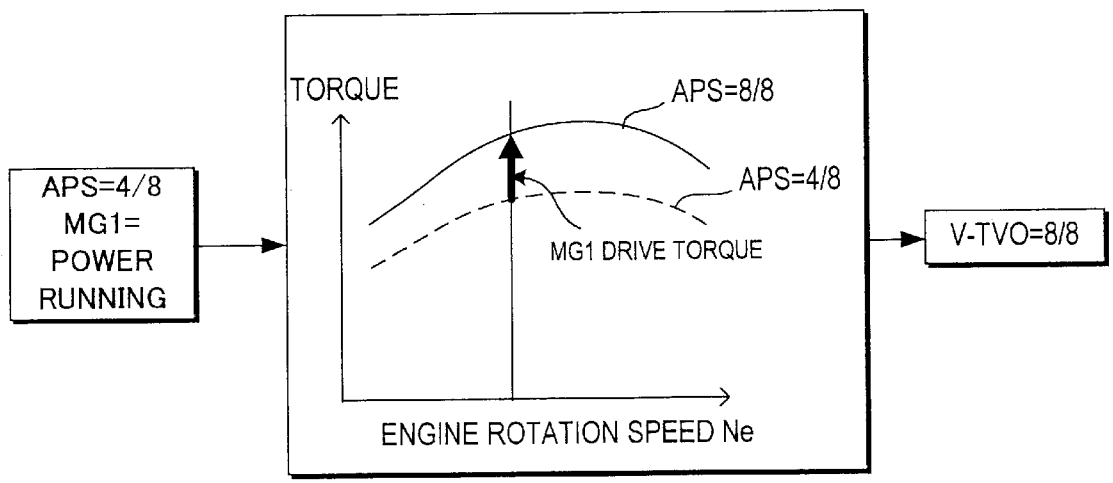
FIG. 8 is a diagram describing the virtual throttle opening V-TVO when the first motor generator drives the vehicle.

In a block B121, in a normal shift map used for ordinary transmission control, a gear position depending on this virtual throttle opening V-TVO and the vehicle speed VSP is calculated using the virtual throttle opening V-TVO instead of the accelerator operation amount APS, and the speed ratio of the automatic transmission 5 is thereby controlled. The virtual throttle opening V-TVO is determined based on the actual accelerator operation amount APS and the power generation amount or the drive torque of the motor generator 1, and the engine rotation speed Ne, as shown in FIG. 7 and FIG. 8.

When the first motor generator 1 generates power, the virtual throttle opening V-TVO is calculated to be smaller than the actual accelerator operation amount APS. As shown in FIG. 7, if the actual accelerator operation amount APS is 8/8, the engine 3 generates an output corresponding to APS=8/8. However, the first motor generator 1 interposed between the engine 3 and automatic transmission 5 absorbs the engine torque due to the power generation. Therefore, assuming that the torque actually input to the automatic transmission 5 becomes a torque corresponding to APS=4/8 due to absorption of torque as a result of this power generation, the virtual throttle opening V-TVO at this time is 4/8.

On the other hand, when the first motor generator 1 is driving the vehicle, the virtual throttle opening V-TVO is calculated to be larger than the actual accelerator operation amount APS. As shown in FIG. 8, assuming that the actual accelerator operation amount APS is 4/8, the engine 3 generates an output corresponding to APS=4/8. However, the drive torque of the first motor generator 1 interposed between the engine 3 and automatic transmission 5 is added to the engine torque. Therefore, assuming that the torque actually input to the automatic transmission 5 becomes a torque corresponding to APS=8/8, the virtual throttle opening V-TVO at this time is 8/8.

Hence, by compensating the variation of the torque actually input to the automatic transmission 5 due to the power generation or drive of the first motor generator 1 using the virtual throttle opening V-TVO, smooth transmission control can be performed.

Next, the drive force control performed by the drive force controller 10 will be described referring to the flowcharts of FIG. 9 to FIG. 12.

Figure 9:
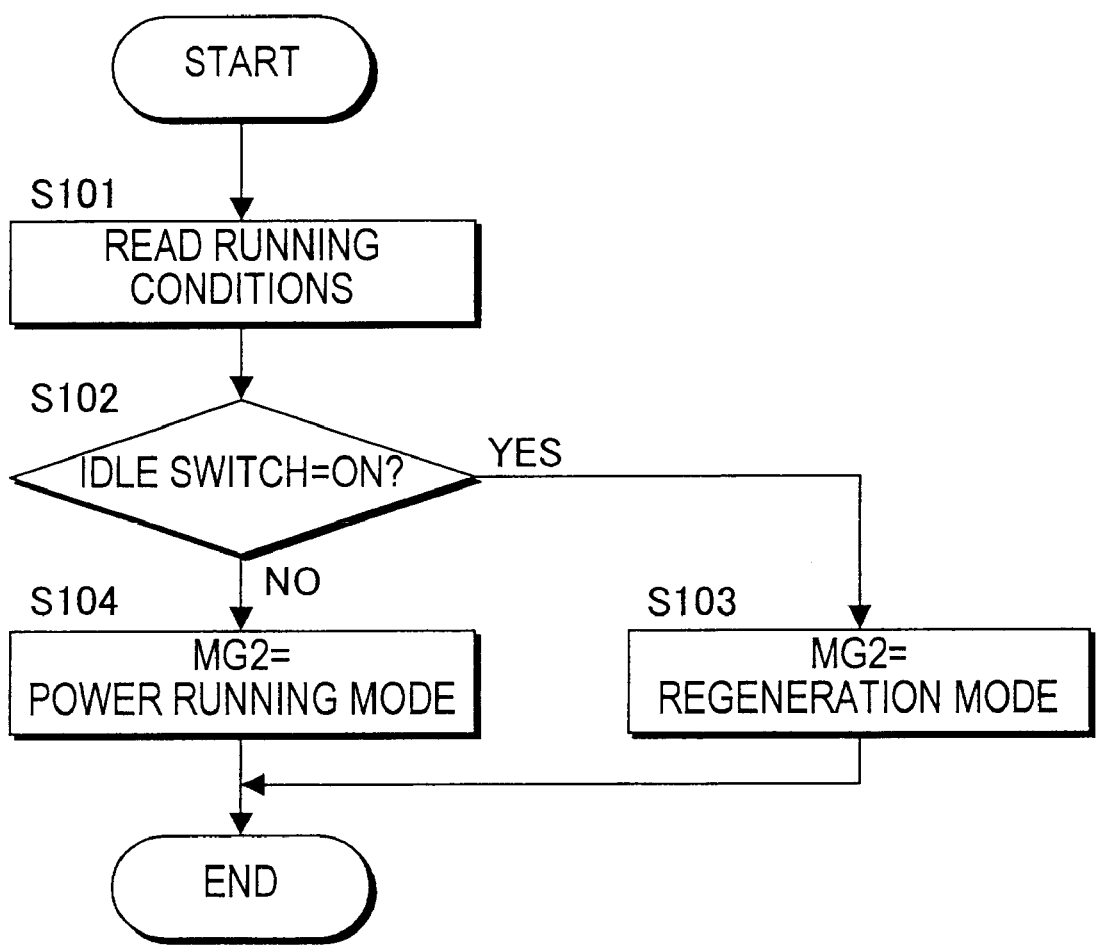
FIG. 9 is a flowchart showing a main routine in drive force control.

FIG. 9 is a flowchart showing a main routine in drive force control. This routine is performed repeatedly at a predetermined interval, e.g., 10 milliseconds.

In a step S101 of FIG. 9, the outputs of the above sensors are read. In a step S102, the signal from the idle switch 24 is determined. When the accelerator pedal is released and the idle switch 24 is ON, the routine proceeds to a step S103. On the other hand, when the accelerator pedal is depressed and the idle switch 24 is OFF, the routine proceeds to a step S104.

In the step S103, the regenerating amount of the second motor generator 2 is computed (regeneration mode). On the other hand, in the step S104, the drive torque of the second motor generator 2 is determined based on the running state of the vehicle (power running mode).

After computing the regenerating amount or drive torque of the motor generator 2, the drive force controller 10 controls the second motor generator 2 via the motor generator controller 13 and the inverter 9.

Figure 10:
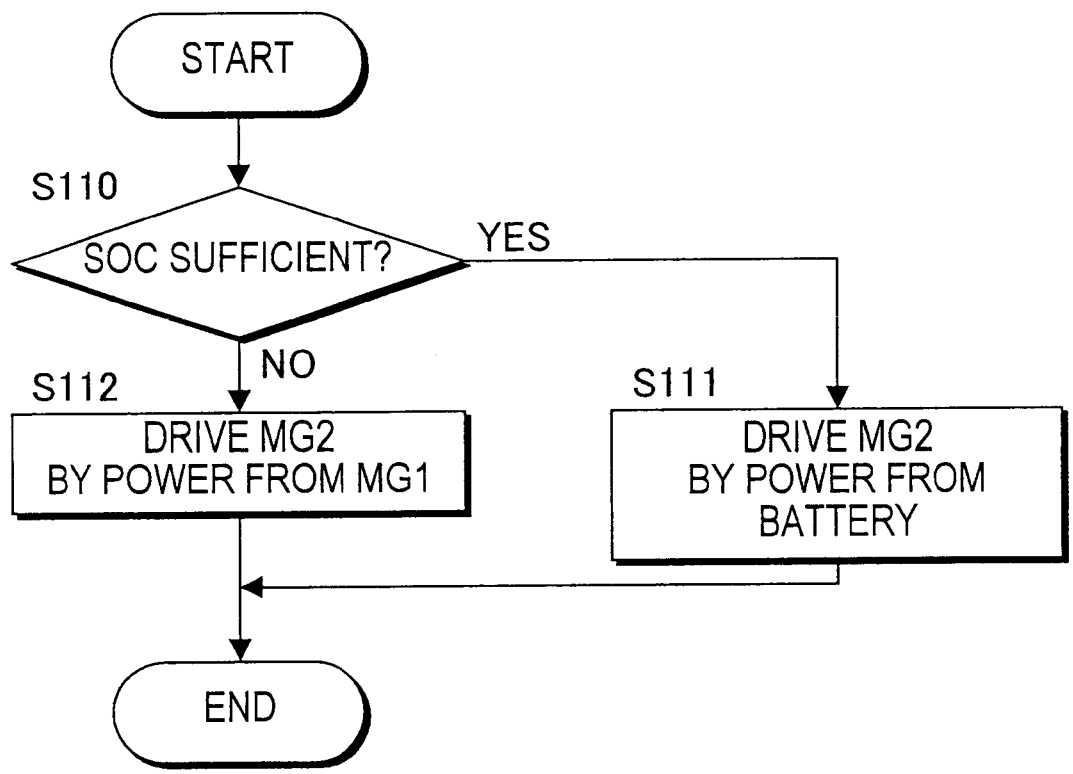
FIG. 10 is a flowchart showing a subroutine for determining a driving state of the second motor generator.

FIG. 10 is a flowchart showing a subroutine for determining a driving state of the second motor generator 2. This subroutine is performed repeatedly at a predetermined interval, e.g., 10 milliseconds, when the power running mode is selected in the step S104.

First, in the step S110, it is determined whether or not the charge amount is sufficient from the charge state SOC of the battery 8.

When the charge amount of the battery 8 is sufficient, the routine proceeds to a step S111, and the second motor generator 2 is driven by the power supplied from the battery 8. On the other hand, when the charge amount of the battery 8 is insufficient, the routine proceeds to a step S112, the first motor generator 1 generates power, the second motor generator 2 is driven by the power generated by the first motor generator 1 and the battery 8 is charged.

Figure 11:
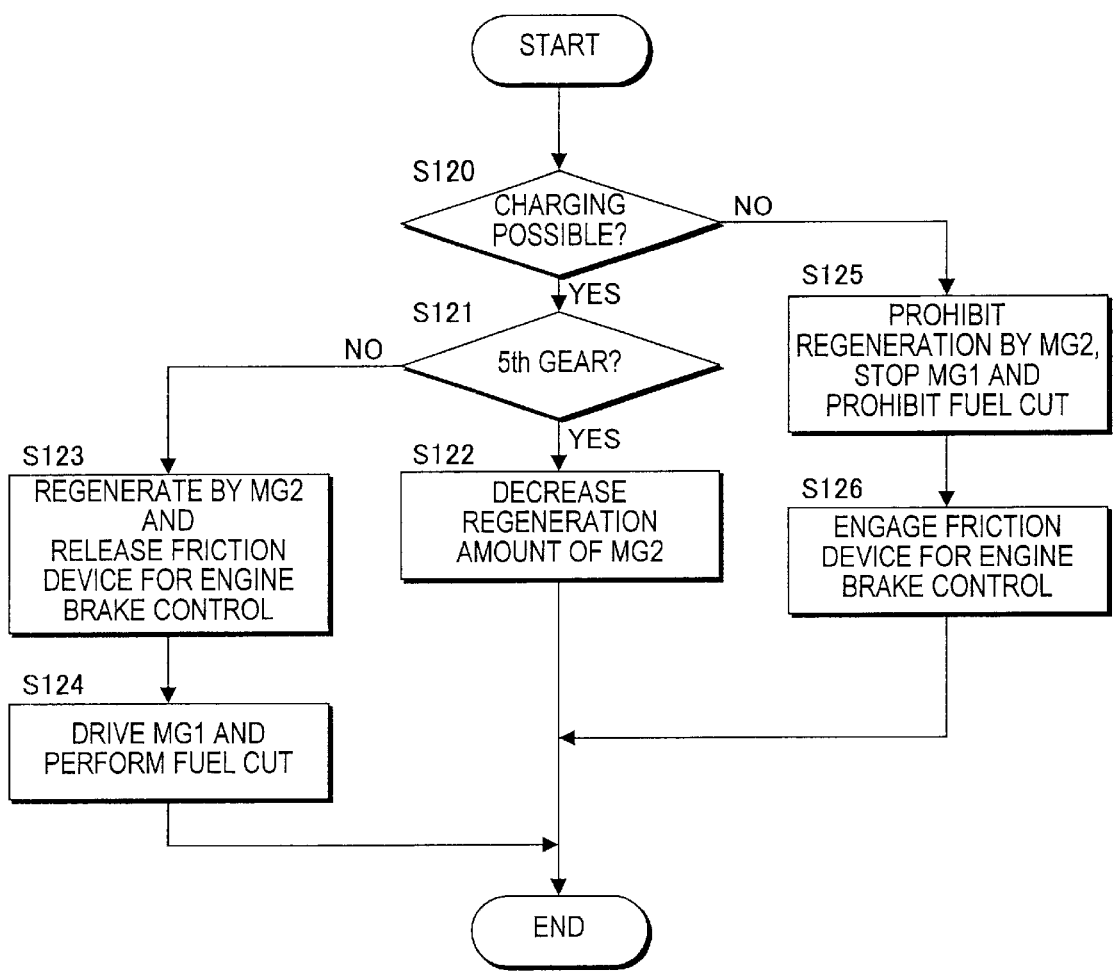
FIG. 11 is a flowchart showing a subroutine for determining a regeneration state of the second motor generator.

FIG. 11 is a flowchart showing a subroutine for determining a regenerating state of the second motor generator 2. This subroutine is performed repeatedly at a predetermined interval, e.g., 10 milliseconds, when the regeneration mode is selected in the step S103.

First, in a step S120, it is determined whether or not charging is possible based on the charge state SOC of the battery 8. If charging is possible, the routine proceeds to a step S121, and if charging is not possible due for example to the fact that the charge amount is saturated (near its maximum capacity), the routine proceeds to a step S125.

In the step S121, it is determined whether or not the present gear position is fifth gear which is the highest speed gear, and if it is fifth gear, the routine proceeds to a step S122. When it is fifth gear, the fourth brake B4 and first clutch C1 are engaged and the engine brake will definitely operate as described above, so the regenerating amount (power generation amount) due to the second motor generator 2 is corrected in the decreasing direction to prevent engine braking from becoming excessive.

On the other hand, when charging is possible and the gear position is a position other than fifth gear, the routine proceeds to steps S123, S124 and power is regenerated by the second motor generator 2. At the same time, the friction device which controls the engine brake (in first gear to third gear, the second brake B2) is released, transmission of torque from the automatic transmission 5 to the motor generator 1 is interrupted, and the engine 3 is driven by the first motor generator 1 while performing fuel cut of the engine 3.

At this time, the motor generator 1 drives the engine 3 so as to reach an engine rotation speed at which the engine 3 can be restarted immediately. Preferably, the engine rotation speed is controlled to be the speed at which re-engagement of the friction devices of the automatic transmission 5 can be performed without relative rotation, especially when the charge amount of the battery 8 is near its maximum capacity.

When it is determined that charging is not possible in the step S120, the routine proceeds to steps S125, S126, regeneration by the second motor generator 2 is prohibited and the drive of the first motor generator 1 is stopped. At the same time, fuel cut is prohibited, and the friction device used for engine brake control (in first gear to third gear, the second brake B2) is engaged so that the engine brake is applied.

Figure 12:
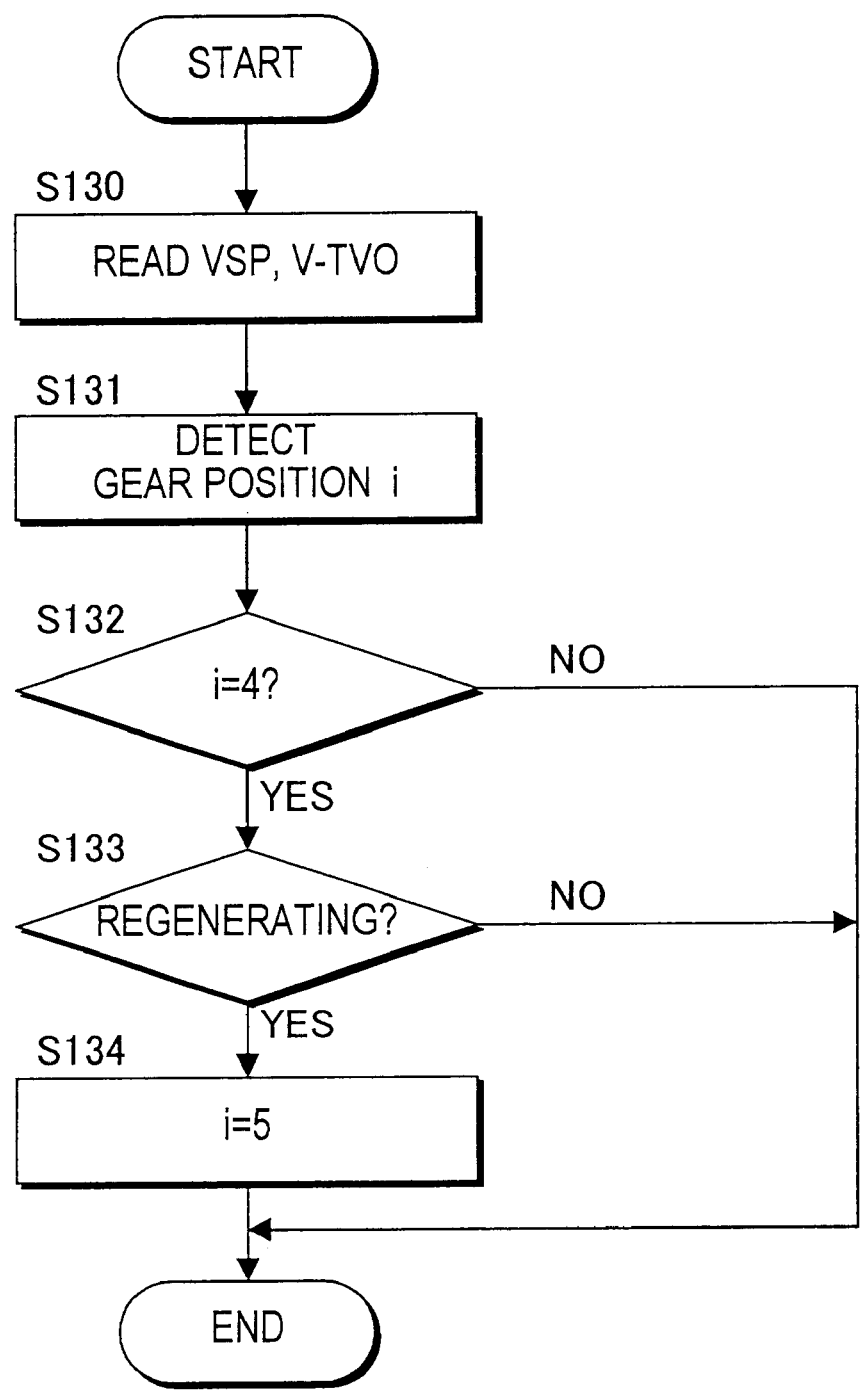
FIG. 12 is a flowchart showing a routine in the speed change control.

FIG. 12 is a flowchart showing the details of the speed change control. This flowchart is also performed at a predetermined interval, e.g., 10 milliseconds.

First, in a step S130, the vehicle speed VSP and virtual throttle opening V-TVO are read. In the step S131, a gear position i corresponding to the vehicle speed VSP and virtual throttle opening V-TVO is detected from a shift in the block B121.

In a step S132, it is determined whether or not the gear position i is fourth gear. If it is a position other than fourth gear, the gear position of the automatic transmission 5 is controlled so that the gear position is i, and the routine is terminated. On the other hand, if the gear position is fourth gear, the routine proceeds to a step S133, and it is determined whether or not regeneration is being performed.

If regeneration is not being performed, the routine is terminated without modification. Conversely, if regeneration is being performed, the routine proceeds to a step S134 and an upshift to fifth gear is performed.

In fourth gear, the fourth brake B4 and first clutch C1 are engaged and the engine brake will definitely operate, as in fifth gear, but by performing an upshift to fifth gear which is a high speed gear in this way, the engine braking force is prevented from becoming excessive.

When the above mentioned regeneration control is not performed, for example during normal running, the output of the engine 3 drives the rear wheels 7 via the automatic transmission 5. When the charge state SOC of the battery 8 falls, part of the engine output is used to make the motor generator 1 function as a generator as necessary, and perform charging of the battery 8.

When rapid acceleration is required, the rear wheels 7 are driven by both the first motor generator 1 and the engine 3, and when a still larger drive force is required, the motor generator 2 drives the front wheels 17 to supplement the drive force. Further, on a road with low friction such as when there is snow, and the rear wheels 7 rotate idly, four-wheel drive is performed wherein the second motor generator 2 drives the front wheels 17.

Figure 13:
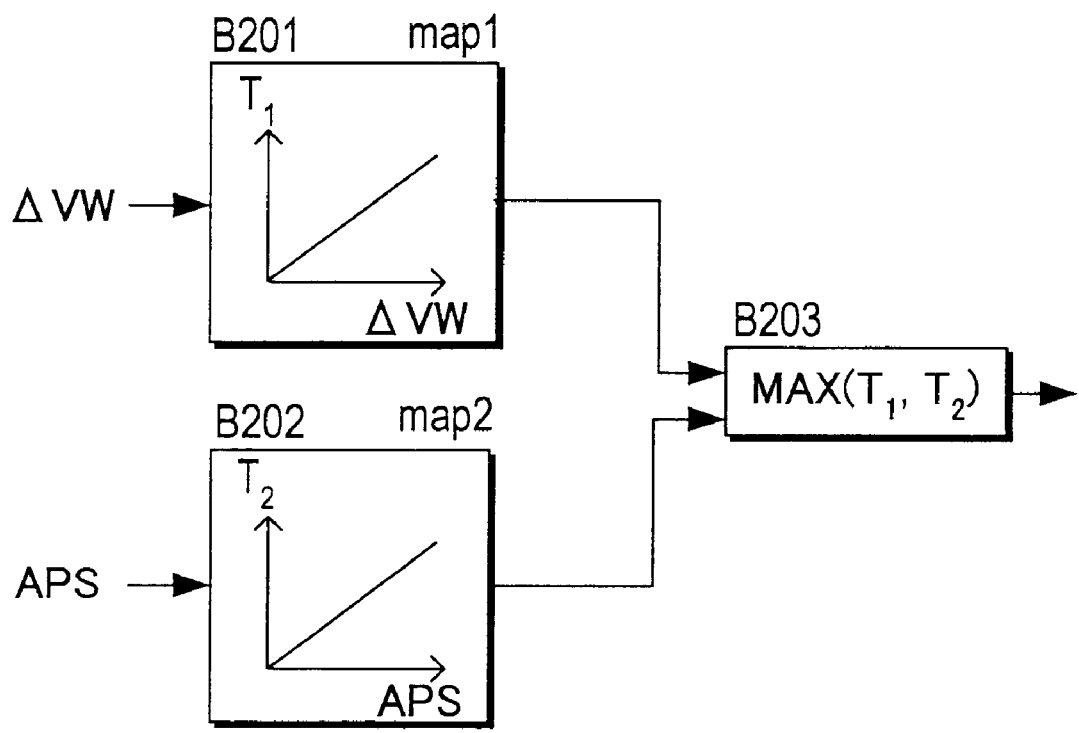
FIG. 13 is a block diagram showing a target torque computation routine of the second motor generator during four-wheel drive.

In the control of the torque generated by the second motor generator 2 during four-wheel drive, as shown in FIG. 13, if the rotation speed difference of the rear wheels 7 and front wheels 17 is ΔVW, a torque $T_1$ is computed according to the rotation speed difference ΔVW in a block B201, and a torque $T_2$ according to the accelerator operation amount APS is computed in a block B202. In a block B203, the larger of the torques $T_1$, $T_2$ is used as the target torque of the second motor generator 2.

In this way, the rear wheels 7 are driven by the engine 3 and the first motor generator 1, while the front wheels 17 are driven and power is regenerated (braking is performed) by the second motor generator 2. Hence, a four-wheel drive hybrid vehicle can easily be manufactured using the conventional automatic transmission 5. There is no need for a drive force distribution mechanism such as a center differential gear, the construction is simple, and increase of manufacturing costs is suppressed.

The second motor generator 2 can be driven also by the power generated by the first motor generator 1 connected to the engine 3, so even if the charge amount of the battery 8 is low, four-wheel drive can still be performed.

When an engine is combined with a motor generator, if the motor generator is provided on the opposite side to the transmission of the engine crankshaft, the assembly of the motor generator becomes complex due to the engine accessories. However, by placing the motor generator 1 between the engine 3 and transmission 5 as in this invention, a hybrid four-wheel drive vehicle can easily be realized while maintaining the same construction for the engine 3 as in the prior art.

During power regeneration, the second motor generator 2 connected to the front wheels 17 generates power, the automatic transmission 5 connected to the rear wheels 7 releases the second brake B2 which is the friction device used for engine brake control, and the engine brake torque is thereby prevented from acting on the first motor generator 1. At this time, by driving the engine 3 by the first motor generator 1 (idle rotation) and performing fuel cut, fuel cost-performance can be improved while a large amount of power is regenerated, and the regeneration amount can be increased to charge the battery 8 more rapidly than when the second brake B2 is engaged. Further, the engine brake force is generated by the power generation of the second motor generator 2 which is connected to the front wheels 17, so optimum engine braking can be performed without the engine brake torque being affected by the gear position.

Further, during power regeneration, the friction device used for controlling engine braking is released and the engine 3 is rotated by the first motor generator 1, so the engine rotation speed can be set to any desired rotation speed with a view to restarting the engine, and engine restarting can be performed smoothly and easily. When power is being regenerated by the second motor generator 2, there is no concern that the engine will stall, so fuel cut can be performed while recovering power down to a very low speed, and fuel cost-performance can be improved.

If the charge amount of the battery 8 has reached saturation, the friction device is engaged to perform normal engine braking and stop power regeneration, so engine braking can be maintained while preventing overcharging of the battery 8.

The friction device is the second brake B2 which is installed parallel with a one-way clutch (second one-way clutch F2) used for controlling engine braking, so in the construction of the hybrid vehicle, there is no need to provide a special clutch such as a solenoid clutch, and by using the conventional automatic transmission 5, manufacturing costs can be largely suppressed. If the friction device used for controlling engine braking were the forward clutch of a forward/reverse change-over mechanism, the forward clutch is generally controlled by a manual valve which operates in synchronism with a selector lever, therefore art additional mechanism would be required to interrupt transmission by electronic control, and it would be impossible to prevent rise of manufacturing costs.

When regeneration is performed in a gear position (fourth gear) wherein the engine brake torque cannot be interrupted by the friction device used for controlling engine braking, engine braking is prevented from becoming excessive while increasing the regeneration amount by the second motor generator 2 by performing an upshift to the high speed side.

Further, the input torque of the automatic transmission 5 is calculated based on the output torque of the engine 3 and the torque generated or consumed by the first motor generator 1, the accelerator operation amount when this input torque is generated only by the engine 3 is set to the virtual throttle opening V-TVO, and this virtual throttle opening V-TWO is used for speed change control. Therefore, a hybrid vehicle can easily be constructed using the shift map of the conventional automatic transmission 5, and rise of manufacturing costs can be suppressed.

The entire contents of Japanese Patent Applications P2001-007390 (filed Jan. 16, 2001) and JP-A-2000-14103 (published by the Japanese Patent Office in 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A hybrid vehicle, comprising:
   a first drive wheel,
   a second drive wheel,
   an automatic transmission,
   a first motor generator and engine connected to the first drive wheel via the transmission,
   a second motor generator connected to the second drive wheel,
   a battery electrically connected to the first and second motor generators, and
   a controller functioning to:
   determine a running state of the vehicle,
   determine a charge state of the battery,
   control the drive force of the engine and the first motor generator based on the running state of the vehicle and the charge state of the battery, and
   drive the second motor generator using the battery and the power generated by the first motor generator.

2. The hybrid vehicle as defined in claim 1, further comprising a sensor which detects an operation amount of an accelerator pedal, and wherein:
   the transmission further comprises a friction device which connects the engine with the first drive wheel, and
   the controller further functions to release the friction device and perform regeneration by the second motor generator when the accelerator pedal is released.

3. The hybrid vehicle as defined in claim 2, wherein the controller further functions to stop the fuel supply to the engine and rotate the engine by the first motor generator when the accelerator pedal is released and regeneration is performed by the second motor generator.

4. The hybrid vehicle as defined in claim 2, wherein the controller further functions to engage the friction device and cause the engine brake to be operated by the engine when the accelerator pedal is released and the charge state of the battery is saturated.

5. The hybrid vehicle as defined in claim 2, wherein the transmission further comprises a one-way clutch, and the friction device is disposed in parallel with the one-way clutch.

6. The hybrid vehicle as defined in claim 5, wherein the controller further functions to perform an upshift operation when the gear position of the transmission which depends on the running state, is set to a gear position wherein the engine braking torque is not transmitted through the friction device.

7. The hybrid vehicle as defined in claim 1, wherein the controller further functions to:

compute the output torque of the engine, compute the torque generated or consumed by the first motor generator, compute the torque input to the transmission based on the output torque of the engine and the torque generated or consumed by the first motor generator, compute a virtual accelerator operation amount required for the computed input torque to be generated only by the engine, and perform the speed change control of the transmission based on the virtual accelerator operation amount.

8. A hybrid vehicle, comprising:

a first drive wheel, a second drive wheel, an automatic transmission, a first motor generator and engine connected to the first drive wheel via the transmission, a second motor generator connected to the second drive wheel, a battery electrically connected to the first and second motor generators, means for determining a running state of the vehicle, means for determining a charge state of the battery, means for controlling the drive force of the engine and the first motor generator based on the running state of the vehicle and the charge state of the battery, and means for driving the second motor generator using the battery and the power generated by the first motor generator.

* * * * *